US008587568B2

(12) United States Patent
Ogawa

(10) Patent No.: US 8,587,568 B2

(45) Date of Patent: Nov. 19, 2013

(54) INTEGRATED CIRCUIT DEVICE, ELECTRONIC APPARATUS AND METHOD FOR MANUFACTURING OF ELECTRONIC APPARATUS

(75) Inventor: Hideki Ogawa, Fujimi-machi (JP)

(73) Assignee: Seiko Epson Corporation (JP)

( * ) Notice: Subject to any disclaimer, the term of this patent is extended or adjusted under 35 U.S.C. 154(b) by 492 days.

(21) Appl. No.: 12/730,300

(22) Filed: Mar. 24, 2010

(65) Prior Publication Data

US 2011/0029115 A1 Feb. 3, 2011

(30) Foreign Application Priority Data

Jul. 28, 2009 (JP) ................................. 2009-175011

(51) Int. Cl.

| | |
|---|---|
| ***G06F 19/00*** | (2011.01) |
| ***G06F 3/038*** | (2013.01) |
| ***G09G 5/02*** | (2006.01) |
| ***H02J 1/00*** | (2006.01) |
| ***G06F 7/38*** | (2006.01) |

(52) U.S. Cl.

USPC ................ 345/204; 345/697; 307/80; 712/22

(58) Field of Classification Search

USPC ............................ 345/204–211; 700/97, 117

See application file for complete search history.

(56) References Cited

U.S. PATENT DOCUMENTS

| | | | | |
|---|---|---|---|---|
| 5,642,323 | A | 6/1997 | Kotani et al. | |
| 7,149,882 | B2 * | 12/2006 | Glew et al. | 712/222 |
| 2003/0201673 | A1 * | 10/2003 | Sim et al. | 307/80 |
| 2005/0062733 | A1 * | 3/2005 | Morita | 345/204 |
| 2006/0087013 | A1 | 4/2006 | Hsieh | |
| 2009/0225107 | A1 * | 9/2009 | Nose et al. | 345/697 |

FOREIGN PATENT DOCUMENTS

| | | |
|---|---|---|
| JP | 2005-266162 A | 9/2005 |
| JP | 2008-065294 A | 3/2008 |
| JP | 2008-224796 | 9/2008 |
| JP | 2009-053639 | 3/2009 |
| JP | 2009-164202 A | 7/2009 |

* cited by examiner

*Primary Examiner* — Alexander Eisen

*Assistant Examiner* — Amit Chatly

(74) *Attorney, Agent, or Firm* — Harness, Dickey & Pierce, P.L.C.

(57) ABSTRACT

An integrated circuit device includes a host I/F, an information register, and a control section. The information register stores wave selection information for selecting waveform information which defines a waveform of a drive signal of the electro-optical device. Waveform information selected by the wave selection information stored in the information register from among a plurality of pieces of waveform information is loaded to an information memory at the time of manufacturing an electronic apparatus including the electro-optical device. The control section controls the display of the electro-optical device on the basis of the waveform information read from the information memory at the time of an actual operation of the electronic apparatus.

14 Claims, 15 Drawing Sheets

FIG. 5A
WAVE SELECTION INFORMATION
| MANUFACTURING LOT NUMBER |
| --- |
| ⋮ |
FIG. 5B
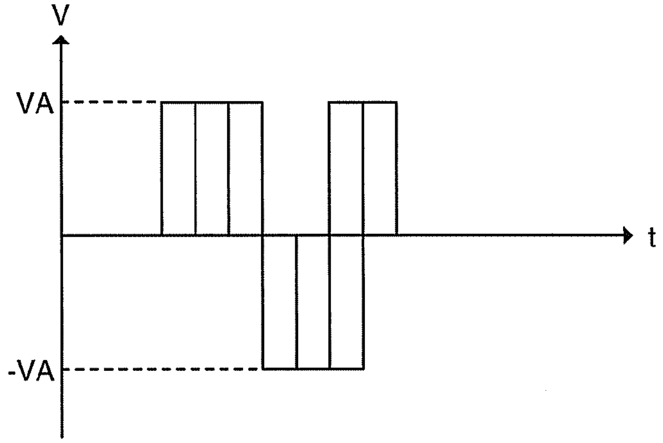
FIG. 5C
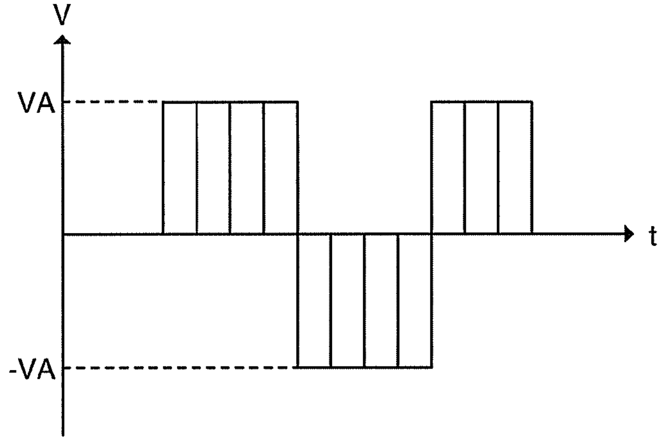

INSTRUCTION CODE INFORMATION

| COMMAND | INSTRUCTION |
|---|---|
| CMA | INSA1<br>INSA2<br>INSA3<br>⋮ |
| CMB | INSB1<br>INSB2<br>INSB3<br>⋮ |
| CMC | INSC1<br>INSC2<br>INSC3<br>⋮ |
| ⋮ | ⋮ |

FIG. 6

COMMAND LIST

| COMMAND | CONTENT |
|---|---|
| RUN_SYS | MOVE TO RUN MODE |
| STBY | MOVE TO STANDBY MODE |
| SLP | MOVE TO SLEEP MODE |
| INIT_SYS_RUN | MOVE TO RUN MODE BY INITIALIZATION |
| INIT_DSPE_CFG | DISPLAY ENGINE INITIALIZATION |
| INIT_DSPE_TMG | DISPLAY TIMING INITIALIZATION |
| RD_REG | REGISTER READ |
| WD_REG | REGISTER WRITE |
| BST_RD_SDR | IMAGE MEMORY BURST READ |
| BST_WR_SDR | IMAGE MEMORY BURST WRITE |
| LD_IMG | LOAD FULL IMAGE |
| LD_IMG_AREA | LOAD AREA IMAGE |
| RD_WFM_INFO | WAVEFORM INFORMATION READ |
| UPD_GDRV_CLR | SCAN DRIVER CLEAR |
| WAIT_DSPE_TRG | DISPLAY ENGINE OPERATION COMPLETION WAITING |
| ⋮ | ⋮ |

FIG. 7

FIG. 10A MANUFACTURING TIME
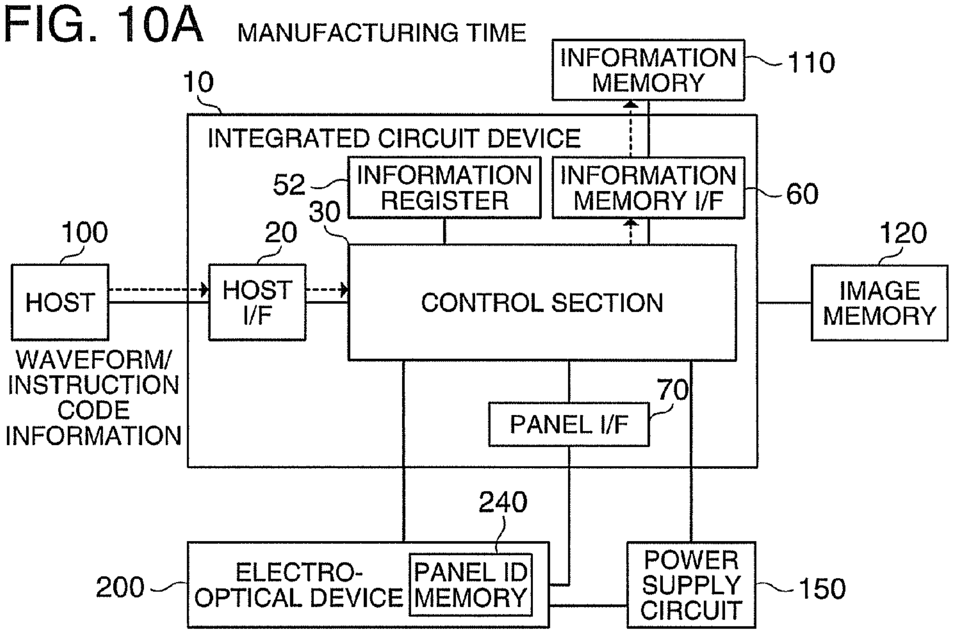
FIG. 10B ACTUAL OPERATION TIME
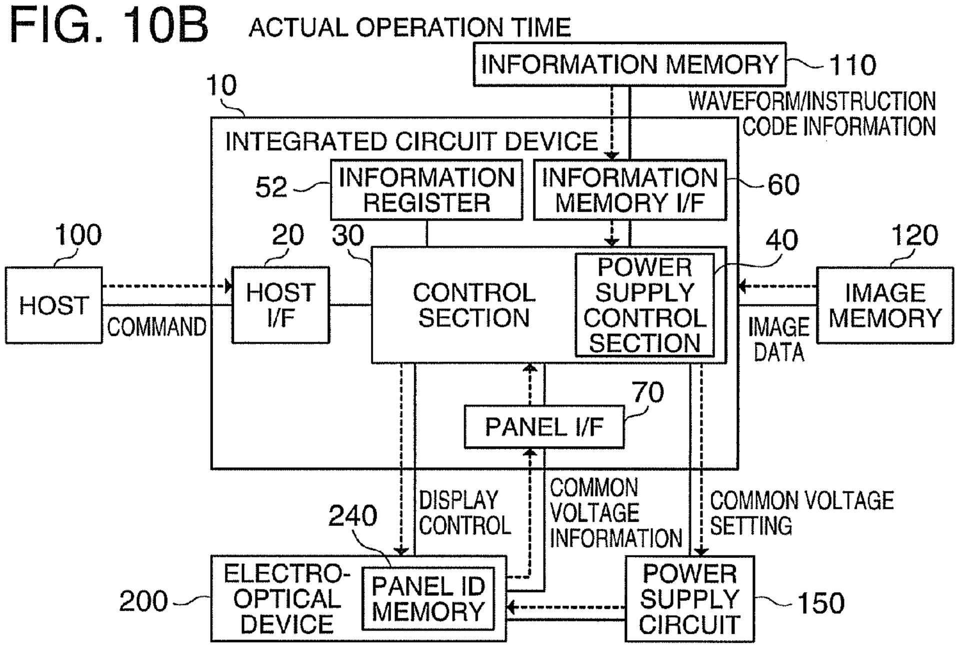

INTEGRATED CIRCUIT DEVICE, ELECTRONIC APPARATUS AND METHOD FOR MANUFACTURING OF ELECTRONIC APPARATUS

This application claims priority based on Japanese Patent Application No. 2009-175011, filed on Jul. 28, 2009, which is incorporated in this specification.

TECHNICAL FIELD

An aspect of the present invention relates to an integrated circuit device, an electronic apparatus, a method for manufacturing an electronic apparatus.

BACKGROUND ART

In the related art, an electronic apparatus having an electro-optical panel such as a liquid crystal display panel or an electrophoretic display panel is known. For example, a technique is disclosed in Patent Document 1 as the related art of the electrophoretic display panel.

When the electronic apparatus having the above-described electro-optical panel is manufactured, the apparatus is assembled by mounting a panel module having an electro-optical panel and a system board having a host CPU or a display controller. When the above-described apparatus is manufactured, adjustment corresponding to display characteristics of the panel module may be necessary. For example, various settings are adjusted so that display characteristics of the electro-optical panel are optimal.

When the above-described adjustment is manually performed, the manufacturing throughput of electronic apparatus is degraded. Thus, there is a problem in that mass production is difficult due to an adjustment time. In particular, since the variation of display characteristics is large for each manufacturing lot in the electrophoretic display panel as compared to the liquid crystal display panel, this problem impedes the mass production.

RELATED ART DOCUMENT

Patent Document

[Patent Document 1] JP-A-2009-53639

DISCLOSURE OF THE INVENTION

Problem that the Invention is to Solve

According to several aspects of the invention, it is possible to provide an integrated circuit device, an electronic apparatus, and a method for manufacturing an electronic apparatus, which increase the efficiency in manufacturing an electronic apparatus.

Means for Solving the Problem

An aspect of the invention relates to an integrated circuit device including: a host interface which executes an interface process with a host; an information register which offers information to the host; and a control section which controls display of an electro-optical device, wherein the information register stores wave selection information for selecting waveform information which defines a waveform of a drive signal of the electro-optical device, wherein waveform information selected by the wave selection information stored in the information register from among a plurality of pieces of waveform information is loaded to an information memory at the time of manufacturing an electronic apparatus including the electro-optical device, and wherein the control section controls the display of the electro-optical device on the basis of the waveform information read from the information memory at the time of an actual operation of the electronic apparatus.

According to the aspect of the invention, wave selection information for selecting waveform information may be offered to the host using the information register. Thereby, it is possible to load waveform information corresponding to the wave selection information to the information memory at the time of manufacturing the electronic apparatus. The display of the electro-optical device may be controlled by reading the waveform information from the information memory at the actual time of operation of an electronic apparatus. Thereby, the electronic apparatus may be efficiently manufactured.

The aspect of the invention may include an information memory interface which executes an interface process with the information memory, the information memory interface may write the waveform information to the information memory when the waveform information selected on the basis of the wave selection information has been acquired via the host interface at the time of manufacturing the electronic apparatus, the information memory interface may read the waveform information from the information memory at the time of the actual operation of the electronic apparatus, and the control section may control the display of the electro-optical device on the basis of the waveform information read from the information memory at the time of the actual operation of the electronic apparatus.

When the above-described information memory interface is provided, it is possible to write the waveform information to the information memory via the information memory interface at the time of manufacturing the electronic apparatus. At the time of the actual operation of the electronic apparatus, the display control for the electro-optical device may be implemented by reading the waveform information from the information memory via the information memory interface.

In the aspect of the invention, the information register may store the wave selection information acquired from the electro-optical device at the time of manufacturing the electronic apparatus, and offer the stored information to the host.

At the time of manufacturing the electronic apparatus, wave selection information may be offered to the host by the information register by acquiring the wave selection information from the electro-optical device embedded into the electronic apparatus. Accordingly, waveform information may be selected by offering appropriate wave selection information corresponding to the embedded electro-optical device to the host.

The aspect of the invention may include an electro-optical device interface which executes an interface process with the electro-optical device, and the electro-optical device interface may read the wave selection information from a memory provided in the electro-optical device at the time of manufacturing the electronic apparatus.

When the above-described electro-optical device interface is provided, it is possible to read wave selection information via the electro-optical device interface and offer the wave selection information to the host at the time of manufacturing the electronic apparatus.

The aspect of the invention may include an electro-optical device interface which executes an interface process with the electro-optical device, the control section may control a power supply circuit of the electro-optical device, the electro-optical device interface may read common voltage information for driving the electro-optical device from the electro-optical device at the time of the actual operation of the electronic apparatus, and the control section may control a common voltage to be output by the power supply circuit on the basis of the read common voltage information.

It is possible to read common voltage information from the electro-optical device at the time of the actual operation of the electronic apparatus by effectively using the electro-optical device interface and to control a common voltage to be output by the power supply circuit.

In the aspect of the invention, the information register may store manufacturing information of the electro-optical device as the wave selection information, the waveform information corresponding to the manufacturing information of the electro-optical device from among the plurality of pieces of waveform information may be loaded to the information memory at the time of manufacturing the electronic apparatus, and the control section may control the display of the electro-optical device on the basis of the waveform information read from the information memory at the time of the actual operation of the electronic apparatus.

Appropriate waveform information corresponding to manufacturing information of the electro-optical device may be selected and loaded to the information memory.

In the aspect of the invention, the information register may store instruction selection information for selecting instruction code information in which an instruction code constituting each command issued by the host is described, instruction code information selected by the instruction selection information stored in the information register from among a plurality of pieces of instruction code information may be loaded to the information memory at the time of manufacturing the electronic apparatus, and the control section may control an operation of the integrated circuit device on the basis of the command issued by the host and the instruction code information read from the information memory at the time of the actual operation of the electronic apparatus.

Another aspect of the invention relates to an integrated circuit device including: a host interface which executes an interface process with a host; an information register which offers information to the host; and a control section which controls display of an electro-optical device, wherein the information register stores instruction selection information for selecting instruction code information in which an instruction code constituting each command issued by the host is described, wherein instruction code information selected by the instruction selection information stored in the information register from among a plurality of pieces of instruction code information is loaded to an information memory at the time of manufacturing the electronic apparatus including the electronic-optical device, and wherein the control section controls an operation of the integrated circuit device on the basis of the command issued by the host and the instruction code information read from the information memory at the time of an actual operation of the electronic apparatus.

According to the other aspect of the invention, instruction selection information for selecting instruction code information may be offered to the host using the information register. Thereby, it is possible to load instruction code information corresponding to instruction selection information to the information memory at the time of manufacturing the electronic apparatus. At the time of the actual operation of the electronic apparatus, the operation of the integrated circuit device may be controlled on the basis of the command from the host and the instruction code information read from the information memory. Thereby, the electronic apparatus may be efficiently manufactured.

In another aspect of the invention, the information register may store stack identification information for identifying a stack mode in which a chip of an image memory storing image data is stacked on the integrated circuit device and a non-stack mode in which the image memory chip is not stacked on the integrated circuit device as the instruction selection information.

It is possible to notify the host of whether the integrated circuit device is in the stack mode or the non-stack mode by the information register.

In another aspect of the invention, in the stack mode, instruction code information for the stack mode from among the plurality of pieces of instruction code information may be loaded to the information memory at the time of manufacturing the electronic apparatus, and the operation of the integrated circuit device may be controlled on the basis of the command issued by the host and the instruction code information for the stack mode at the time of the actual operation of the electronic apparatus. In the non-stack mode, instruction code information for the non-stack mode from among the plurality of pieces of instruction code information may be loaded to the information memory at the time of manufacturing the electronic apparatus, and the operation of the integrated circuit device may be controlled on the basis of the command issued by the host and the instruction code information for the non-stack mode at the time of the actual operation of the electronic apparatus.

When the integrated circuit device is in the stack mode, the operation of the integrated circuit device is controlled on the basis of instruction code information for the stack mode at the time of the actual operation of the electronic apparatus. In the non-stack mode, it is possible to control the operation of the integrated circuit device on the basis of instruction code information for the non-stack mode.

Another aspect of the invention may include a pad for stack identification in which a first power supply voltage may be set by a bonding wire in the stack mode, and a second power supply voltage may be set by a bonding wire in the non-stack mode, and the information register may store the stack identification information set on the basis of a voltage of the pad for stack identification.

It is possible to set the stack mode or the non-stack mode of the integrated circuit device only by setting a voltage by the bonding wire to the pad for stack identification.

A further aspect of the invention relates to an electronic apparatus including: the integrated circuit device described above; and the electro-optical device.

A still further aspect of the invention relates to a method of manufacturing an electronic apparatus having an electro-optical device and an integrated circuit device which controls the electro-optical device, including: acquiring wave selection information for selecting waveform information, which defines a waveform of a drive signal of the electro-optical device, from the electro-optical device, setting the acquired wave selection information to an information register of the integrated circuit device; selecting waveform information for controlling display of the electro-optical device by the integrated circuit device at the time of an actual operation of the electronic apparatus from among a plurality of pieces of waveform information on the basis of the wave selection information set to the information register; and loading the selected waveform information to the information memory from which information is read by the integrated circuit device at the time of the actual operation of the electronic apparatus.

A still further aspect of the invention relates to a method of manufacturing an electronic apparatus having an electro-optical device and an integrated circuit device which controls the electro-optical device, including: acquiring instruction selection information for selecting instruction code information in which an instruction code constituting each command issued by a host is described; setting the acquired instruction selection information to the information register of the integrated circuit device; selecting instruction code information for controlling an operation of the integrated circuit device at the time of an actual operation of the electronic apparatus from among a plurality of pieces of instruction code information on the basis of the instruction selection information set to the information register; and loading the selected instruction code information to the information memory from which information is read by the integrated circuit device at the time of the actual operation of the electronic apparatus.

BRIEF DESCRIPTION OF THE DRAWINGS

FIGS. 5(A) to 5(C) are diagrams illustrating waveform information.

FIG. 6 is a diagram illustrating instruction code information.

FIG. 7 is an example of commands issued by a host.

FIGS. 10(A) and 10(B) are diagrams illustrating a detailed operation of the integrated circuit device of this embodiment.

MODE FOR CARRYING OUT THE INVENTION

Preferred embodiments of the invention are described below in detail. The embodiments described below do not in anyway limit the scope of the invention defined by the claims laid out herein. All elements of the embodiments described below should not necessarily be taken as essential requirements for the invention.

1. Configuration

Figure 1:
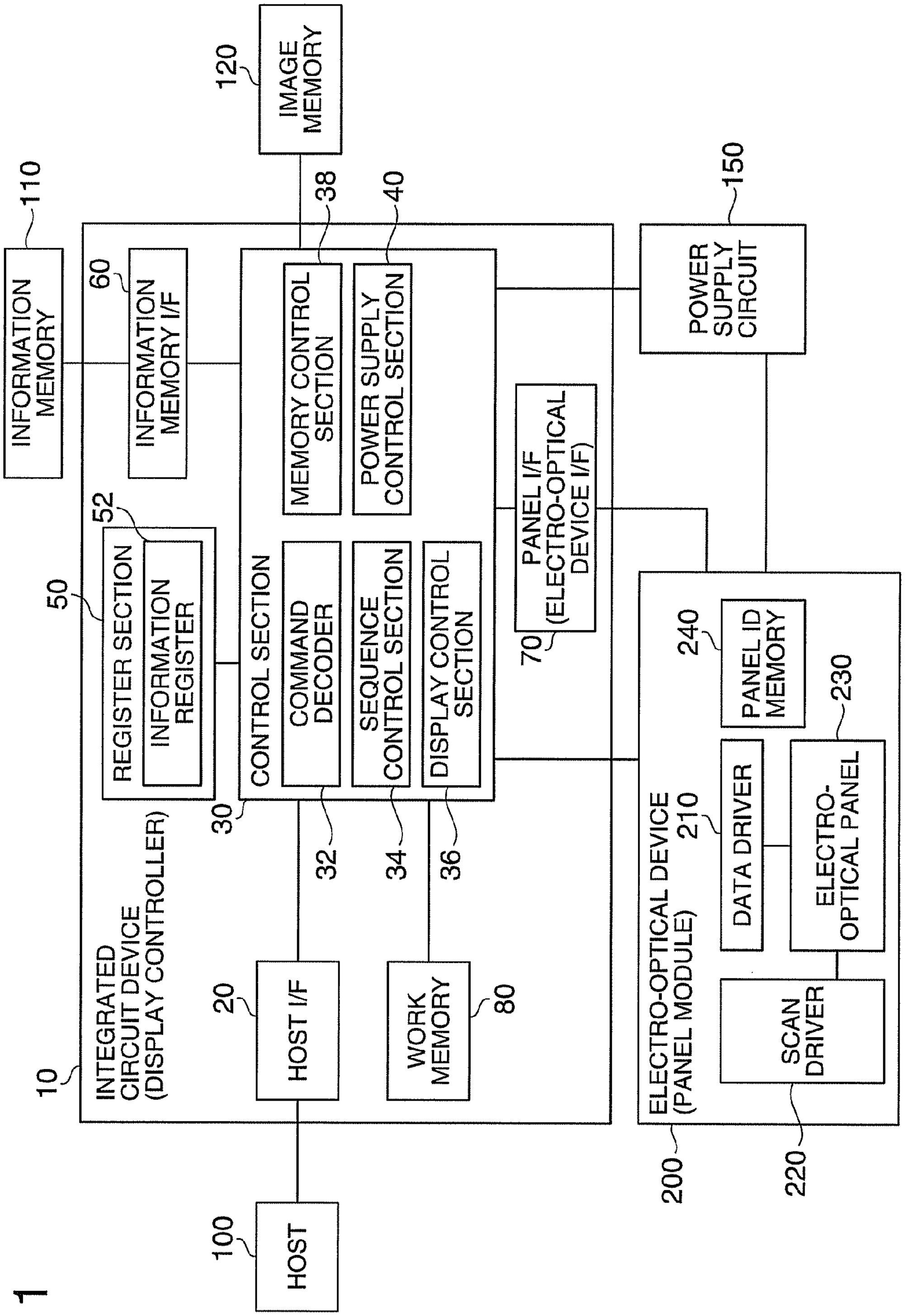
FIG. 1 is a configuration example of an integrated circuit device of this embodiment and an electronic apparatus including the same.

FIG. 1 shows a configuration example of an integrated circuit device 10 of this embodiment and an electronic apparatus including the same. The electronic apparatus includes the integrated circuit device 10 which functions as a display controller or the like, and an electro-optical device 200 of which display is controlled by the integrated circuit device 10. A host 100, an information memory 110, an image memory 120, a power supply circuit 150, and the like may also be included.

The electronic apparatus of this embodiment is not limited to the configuration shown in FIG. 1, and it is possible to make various modifications such as the omission of some elements (for example, a power supply circuit and the like) or the addition of other elements (for example, an operation section and the like). As the electronic apparatus of this embodiment, for example, various apparatus such as electronic books, electronic dictionaries, portable information terminals, portable telephones, portable game machines, portable music players, or digital cameras may be assumed.

The host 100 as a system host executes various processes, and, for example, may be implemented by a processor of a CPU or the like and software (firmware) operating on the processor.

The information memory 110 is a memory which stores and holds waveform information or instruction code information to be described later, and, for example, may be implemented by a non-volatile memory (for example, a flash memory) or the like capable of writing/erasing data.

The image memory 120 (a display memory or a video memory) is a memory which stores data (display data) of an image to be displayed on an electro-optical panel 230, and, for example, may be implemented by a RAM such as an SDRAM or the like.

The power supply circuit 150 is a circuit which supplies the electro-optical device 200 with various powers necessary for driving the electro-optical panel 230, and may be implemented by a power supply control IC or a discrete circuit.

The electro-optical device 200 (a panel module) is a device (module) which implements a display operation by changing optical characteristics of electro-optical elements (an electrophoretic element, a liquid crystal element, an EL element, and the like) of the electro-optical panel 230, and includes a data driver 210, a scan driver 220, the electro-optical panel 230, a panel ID memory 240, and the like. The configuration of the electro-optical device 200 is not limited thereto, and it is possible to make various modifications such as the omission of some elements (for example, a panel ID memory) or the addition of other elements. The data driver 210 and the scan driver 220 may be formed integrally with the electro-optical panel 230.

The electro-optical panel 230 (the display panel) has a plurality of data lines (for example, source lines), a plurality of scan lines (for example, gate lines), and a plurality of pixels in which each pixel is arranged in an intersection position of a data line and a scan line. As the data driver 210 and the scan driver 220 drive a data line and a scan line of the electro-optical panel 230, a display operation is implemented by changing the optical characteristics of an electro-optical element in each pixel region. For example, the electro-optical panel 230 may be an active matrix type panel using a switch element such as a TFT or TFD, and may be a panel other than the active matrix type panel.

As described later, the panel ID memory 240 is a memory which stores manufacturing information (for example, a manufacturing lot), panel information, or the like of the electro-optical device 200, and, for example, may be implemented by a non-volatile memory (for example, an EEPROM) or the like capable of writing/erasing data.

The integrated circuit device 10 includes a host I/F (interface) 20, a control section 30, a register section 50, an information memory I/F 60, a panel I/F 70, and a work memory 80. The configuration of the integrated circuit device 10 is not limited thereto, and it is possible to make various modifications such as the omission of some elements (for example, the information memory I/F, the panel I/F, and the like) or the addition of other elements.

The host I/F 20 executes an interface process with the host 100. For example, an interface with the host 100 is implemented by exchanging an interface signal such as a data signal, an address signal, or a write/read signal with the host 100.

The control section 30 executes various control processes, and, for example, executes a display control process for the electro-optical device 200. The control section 30 executes an entire control process for the integrated circuit device 10, a memory control process for the image memory 120, a control process for the power supply circuit 150, or the like. The control section 30 may be implemented by a gate array circuit, a processor, or the like.

The register section 50 is a block including various registers. For example, the register section 50 includes an information register 52 which offers information to the host 100. Also, a control register, a status register, or the like may be included. The function of the register section 50 may be implemented by a RAM such as an SRAM, a flip-flop circuit, or the like.

The information memory I/F 60 executes an interface process with the information memory 110. For example, an interface with the information memory 110 is implemented by exchanging various interface signals with the information memory 110.

The panel I/F 70 (an electro-optical device interface in a broad sense) executes an interface process with the electro-optical device 200 (the panel ID memory). For example, an interface with the electro-optical device 200 is implemented by exchanging various interface signals with the electro-optical device 200.

The control section 30 includes a command decoder 32, a sequence control section 34, a display control section 36, a memory control section 38, and a power supply control section 40. Various modifications such as the omission of some elements or the addition of other elements are possible.

The command decoder 32 interprets a command by executing a decoding process for the command issued by the host 100. The sequence control section 34 controls various sequences for controlling the operation of the integrated circuit device 10. The display control section 36 controls the display of the electro-optical device 200. For example, a data signal or a control signal to be output to the data driver 210 or the scan driver 220 of the electro-optical device 200 is generated. The power supply control section 40 controls the power supply circuit 150 of the electro-optical device 200. For example, various power supply control signals are generated and output to the power supply circuit 150, and the power supply circuit 150 controls a power supply voltage to be supplied to the electro-optical device 200, a supply timing thereof, or the like.

In this embodiment, the information register 52 stores wave selection information (wave indication information) for selecting (indicating) waveform information. Also, instruction selection information (instruction indication information) for selecting (indicating) instruction code information is stored. For example, the information register 52 stores wave selection information or instruction selection information acquired from the electro-optical device 200 at the time of manufacturing the electronic apparatus, and offers the stored information to the host 100. Specifically, the panel I/F 70 (the electro-optical device interface) reads the wave selection information or the instruction selection information stored in the panel ID memory 240 (a memory in a broad sense) provided in the electro-optical device 200 from the electro-optical device 200, and sets the read information to the information register 52 at the time of manufacturing the electronic apparatus.

When the electronic apparatus (for example, an electronic book, a portable information terminal, or the like having a panel module) including the electro-optical device 200 is manufactured (assembled), waveform information selected (indicated) by the wave selection information stored in the information register 52 from among a plurality of pieces of waveform information is loaded to the information memory 110. The control section 30 controls the display of the electro-optical device 200 on the basis of the waveform information read from the information memory 110 at the time of an actual operation (operation) of the electronic apparatus.

When the electronic apparatus is manufactured, instruction code information selected by instruction selection information stored in the information register 52 from among a plurality of pieces of instruction code information is loaded to the information memory 110. When the electronic apparatus is actually operated, the control section 30 controls the operation of the integrated circuit device 10 on the basis of a command issued by the host 100 and instruction code information read from the information memory 110. For example, various sequence controls for the integrated circuit device 10, memory control for the image memory 120, power supply control for the power supply circuit 150, or display control for the electro-optical device 200 are performed.

Specifically, when waveform information selected on the basis of wave selection information of the information register 52 has been acquired via the host I/F 20 at the time of manufacturing the electronic apparatus, the information memory I/F 60 writes the acquired waveform information to the information memory 110. When instruction code information selected on the basis of instruction selection information of the information register 52 has been acquired via the host I/F 20 at the time of manufacturing the electronic apparatus, the acquired instruction code information is written to the information memory 110.

At the time of the actual operation (operation time) of the electronic apparatus, the information memory I/F 60 reads waveform information or instruction code information from the information memory 110. When the electronic apparatus is actually operated, the control section 30 controls the display of the electro-optical device 200 on the basis of waveform information read from the information memory 110. When the electronic apparatus is actually operated, the operation of the integrated circuit device 10 is controlled on the basis of a command issued by the host 100 and instruction code information read from the information memory 110.

Here, the waveform information is information which defines the waveform of a drive signal of the electro-optical device 200. For example, the data driver 210 of the electro-optical device 200 supplies a drive signal (data signal) having a waveform corresponding to image data stored in the image memory 120 to a data line of the electro-optical panel 230. The waveform information is information which defines a timing or voltage of the waveform of the drive signal. For example, when a waveform is used over a plurality of frames so as to change a pixel grayscale from a first grayscale to a second grayscale, the waveform information becomes information which specifies a voltage to be applied to a pixel of each frame of the waveform over the plurality of frames.

For example, in an electrophoretic display device, the waveform of an optimal drive signal (a drive signal for performing optimal display control) differs according to a manufacturing lot or the like of the electro-optical device 200 (the panel module). In this case, for example, waveform information which defines the waveform of a drive signal optimal for the electro-optical device 200 of which display is controlled by the integrated circuit device 10 is selected at the time of manufacturing the electronic apparatus and is loaded to the information memory 110. When the electronic apparatus is actually operated, the display of the electro-optical device 200 is controlled using the loaded waveform information.

The instruction code information is information in which an instruction code constituting each command to be issued by the host 100 is described. For example, the host 100 issues various commands so as to control the operation of the integrated circuit device 10. Then, the control section 30 receives a command code, a parameter, or the like from the host 100 via the host I/F 20, and performs the operation control for the integrated circuit device 10 (for example, the display control for the electro-optical device) corresponding to an issued command. In this case, a detailed instruction code constituting a command issued by the host 100 is not received from the host 100, and is loaded as the instruction code information to the information memory 110 when the electronic apparatus is manufactured. When the host 100 issues the command, a series of instruction codes constituting the command is specified by instruction code information, a series of instructions corresponding to the series of instruction codes is executed, and the operation of the integrated circuit device 10 is controlled. For example, the instruction code is a code indicating an instruction of writing information (data, an address, or the like) to a control register provided in the register section 50, reading information (data, status, or the like) from a status register provided in the register section 50, or the like.

Next, the operation of this embodiment will be described using FIGS. 2 and 3.

Figure 2:
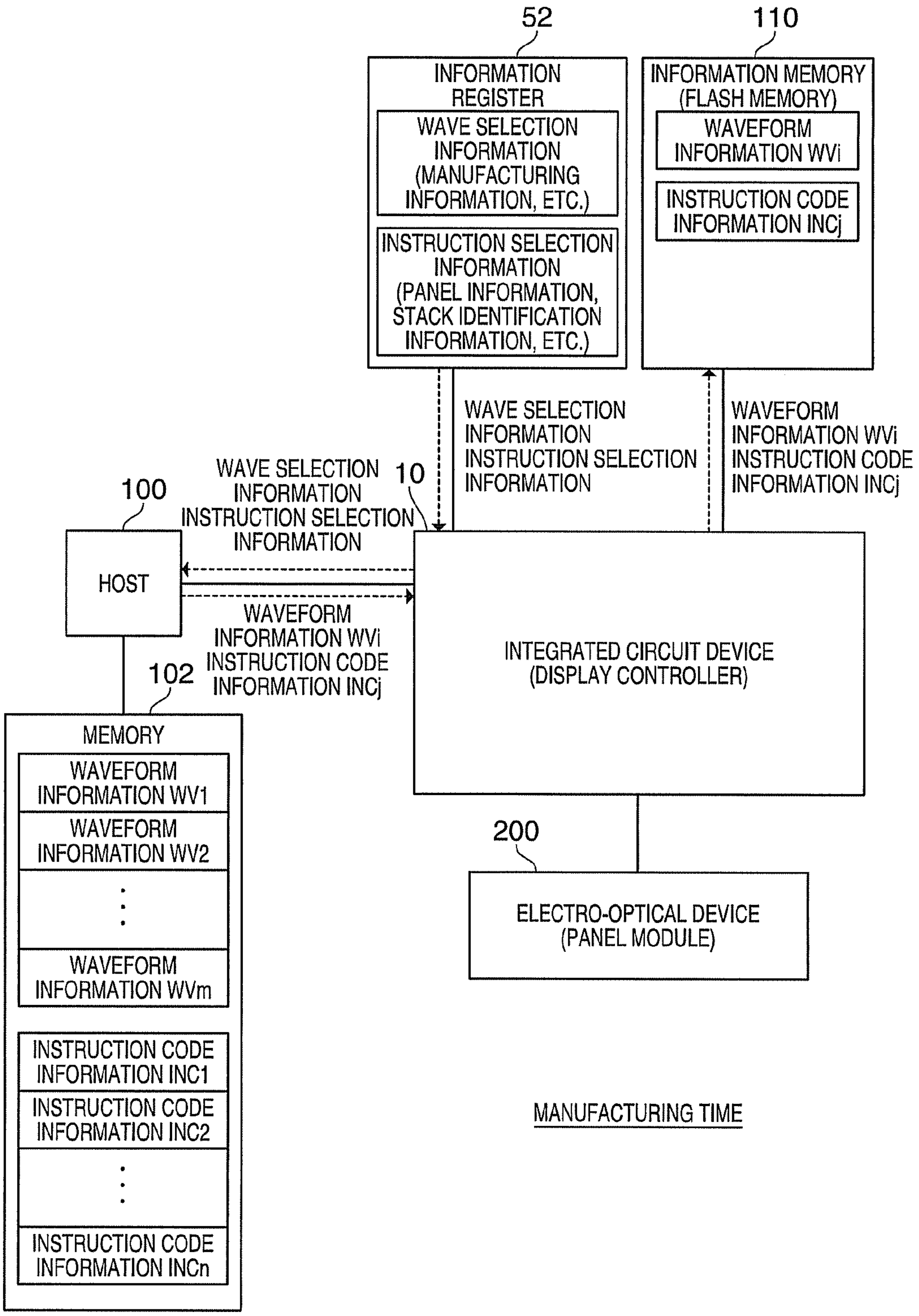
FIG. 2 is a diagram illustrating an operation of the integrated circuit device of this embodiment.

As shown in FIG. 2, a plurality of pieces of waveform information WV1 to WVm and a plurality of pieces of instruction code information INC1 to INCn are stored in the memory 102 accessible by the host 100. Hereinafter, an example of loading both the waveform information and the instruction code information to the information memory 110 will be described, but only one piece of information may be loaded without limiting this embodiment thereto. It is desirable that the memory 102 should be a memory accessible by the host 100. The memory 102 may be a memory provided in the electronic apparatus, and may be a memory (a memory of a PC for production) provided outside thereof. The host (for example, the PC) at the time of manufacturing the electronic apparatus may be different from the host (for example, the CPU) at the time of the actual operation of the electronic apparatus. A process of loading waveform information or instruction code information to the information memory 110 may be implemented by the host 100 directly writing the information to the information memory 110 without involving the integrated circuit device 10.

As shown in FIG. 2, wave selection information or instruction selection information is stored in the information register 52.

Here, the wave selection information is information for selecting waveform information to be loaded to the information memory 110 from among the plurality of pieces of waveform information WV1 to WVm, and, for example, is manufacturing information of a manufacturing lot number or the like of the electro-optical device 200. The manufacturing lot number is a number which specifies a lot in which the electro-optical device 200 (the panel module) has been manufactured.

The instruction selection information is information for selecting instruction code information to be loaded to the information memory 110 from among the plurality of pieces of instruction code information INC1 to INCn, and, for example, is panel information, stack identification information, or the like. The panel information is information for specifying a panel type or size (number of pixels) of the electro-optical device 200. As described later, the stack identification information is information for identifying a stack mode in which a chip of the image memory 120 is stacked on the integrated circuit device 10 and a non-stack mode in which the stack is not made.

The host 100 selects waveform information WVi corresponding to wave selection information from among the waveform information WV1 to WVm on the basis of the wave selection information set to the information register 52. For example, when the wave selection information is the manufacturing information (information which specifies a manufacturing lot, a manufacturing state, a manufacturing date, or the like) of the electro-optical device 200, waveform information optimal for the electro-optical device 200 specified by the manufacturing information is selected from among the waveform information WV1 to WVm. The selected waveform information WVi is loaded and stored in the information memory 110 implemented by a non-volatile flash memory or the like.

The host 100 selects instruction code information INCj corresponding to instruction selection information from among the instruction code information INC1 to INCn on the basis of instruction selection information set to the information register 52. For example, when the instruction selection information is panel information, instruction code information corresponding to a type or size of a panel specified by the panel information is selected from among the instruction code information INC1 to INCn. When the instruction selection information is stack identification information and the mode is the stack mode, instruction code information for the stack mode is selected from among the instruction code information INC1 to INCn. On the other hand, in the case of the non-stack mode, instruction code information for the non-stack mode is selected. The selected instruction code information INCj is loaded and stored in the non-volatile information memory 110.

Figure 3:
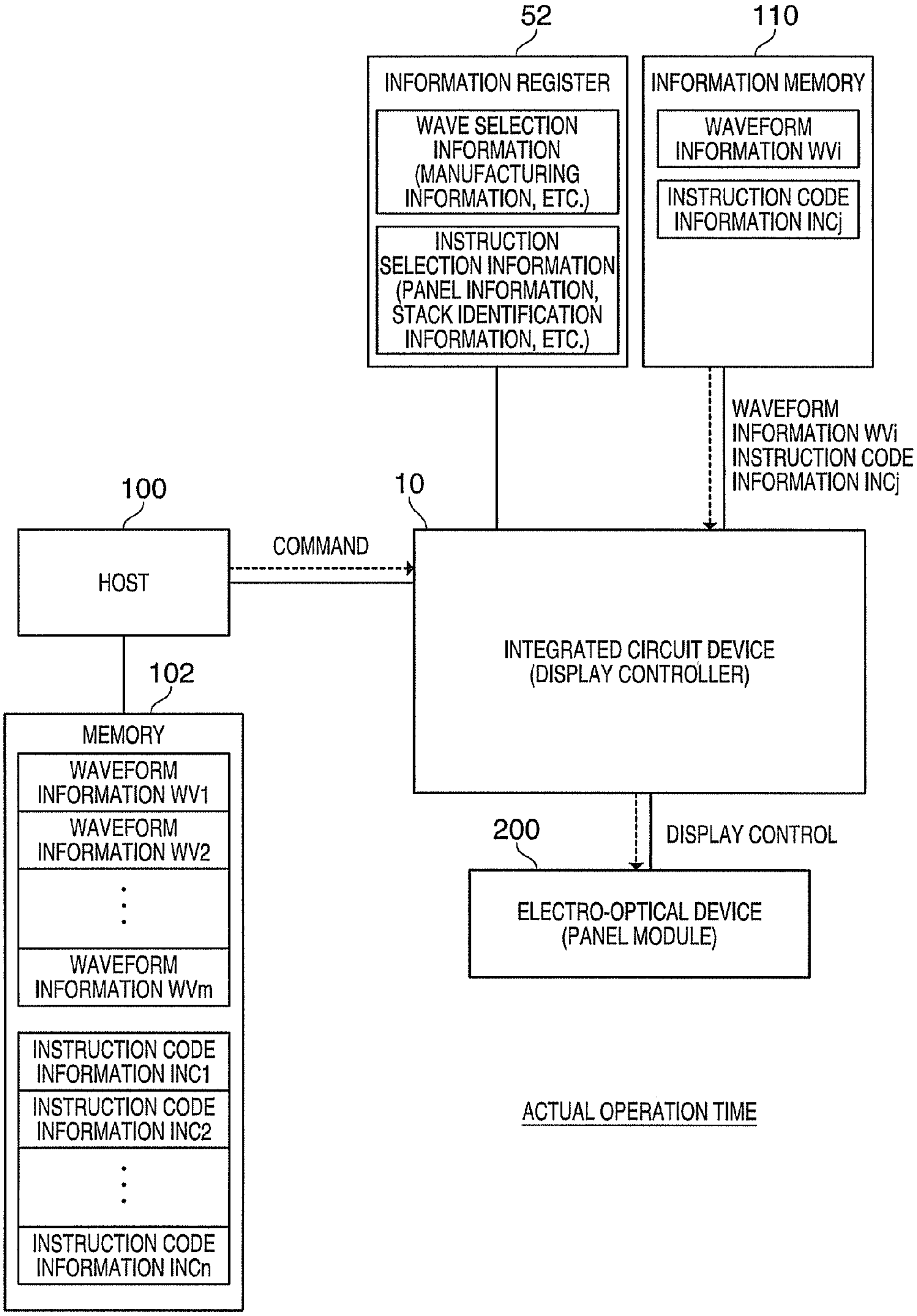
FIG. 3 is a diagram illustrating an operation of the integrated circuit device of this embodiment.

As shown in FIG. 3, waveform information WVi is read from the information memory 110 when the electronic apparatus is actually operated (when a user actually uses the electronic apparatus), and the display of the electro-optical device 200 is controlled on the basis of the waveform information WVi and image data from the image memory 120. For example, a data signal or a control signal corresponding to the waveform information WVi is supplied to the electro-optical device 200, and the display of the electro-optical panel 230 is controlled.

When the host 100 issues a command at the time of the actual operation of the electronic apparatus, the operation of the integrated circuit device 10 is controlled on the basis of the issued command and the instruction code information INCj read from the information memory 110. That is, a plurality of series of instructions corresponding to the command is executed.

According to this embodiment as described above, wave selection information for selecting waveform information or instruction selection information for selecting instruction code information is offered to the host 100 using the information register 52. Waveform information corresponding to the wave selection information or instruction code information corresponding to the instruction selection information is selected by the host 100, and is loaded to the information memory 110 when the electronic apparatus is manufactured. When the electronic apparatus is actually operated, the display of the electro-optical device 200 is controlled on the basis of the loaded waveform information. The operation of the integrated circuit device 10 is controlled on the basis of the loaded instruction code information and the command from the host 100.

Accordingly, for example, even when display characteristics of the electro-optical device 200 have been varied due to a difference or temperature change of a manufacturing lot of the electro-optical device 200, waveform information which implements optimal display characteristics is automatically selected and loaded to the information memory 110. It is possible to prevent a situation where the manufacturing throughput of electronic apparatus is degraded and to facilitate the mass production of electronic apparatus.

As a method of a comparative example of this embodiment, it is possible to consider a method of attaching a barcode for specifying manufacturing information or the like to the module of the electro-optical device 200, reading the barcode by a barcode reader, and selecting waveform information.

However, in the method of the comparative example, the manufacturing throughput of electronic apparatus is degraded since an operation of reading a barcode at the time of manufacturing an electronic apparatus is necessary.

On the other hand, in this embodiment, it is possible to automatically download waveform information to the information memory 110 by the host 100 reading wave selection information since the wave selection information for selecting the waveform information is set to the information register 52. In this embodiment as compared to the method of the comparative example, it is possible to improve the manufacturing throughput of electronic apparatus or the like and facilitate the mass production of electronic apparatus or the like.

When the electronic apparatus is manufactured, it is difficult to determine whether the integrated circuit device 10 is set in one of the stack mode in which the image memory is stacked and the non-stack mode in which the image memory is not stacked. For example, when the external image memory is used in the non-stack mode, a data or address bit width or the like may be different between the image memory stacked on the integrated circuit device 10 and the external image memory. Since the content of an instruction code is also different when the data or address bit width is different, it is necessary to use other instruction code information. Likewise, when a panel type or size is different, the content of an instruction code constituting a display control command is also different.

According to this embodiment for this point, since instruction selection information for selecting instruction code information is set to the information register 52, it is possible to automatically download the instruction code information to the information memory 110 by the host 100 reading the instruction selection information. Accordingly, for example, instruction code information for the stack mode is automatically loaded to the information memory 110 when the integrated circuit device 10 is in the stack mode, and instruction code information for the non-stack mode is automatically loaded in the case of the non-stack mode. Also, instruction code information corresponding to a panel type or size is automatically loaded to the information memory 110. Accordingly, this is able to promote the efficiency of manufacturing as compared to a method of manually selecting and loading instruction code information when the electronic apparatus is manufactured. Accordingly, it is possible to improve the manufacturing throughput and facilitate the mass production of electronic apparatus or the like.

2. Waveform Information

Next, an example of waveform information will be described. Here, an example of waveform information of an electrophoretic display device will be described.

Figure 4A:
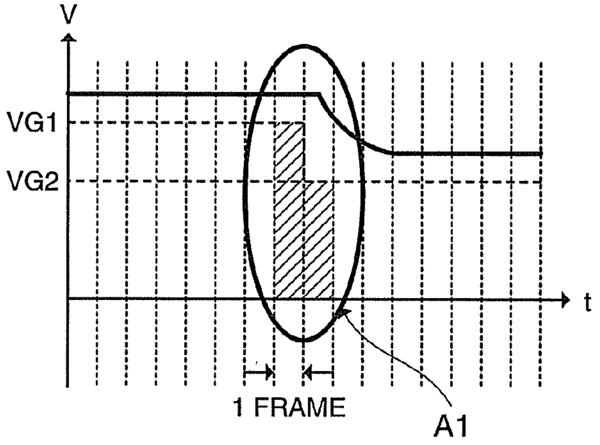
FIGS. 4(A) to 4(C) are diagrams illustrating waveform information.

For example, when a pixel grayscale is changed from the first grayscale to the second grayscale in the liquid crystal display device as indicated by A1 of FIG. 4(A), a data voltage of a data line (source line) is also changed from a data voltage VG1 corresponding to the first grayscale to a data voltage VG2 corresponding to the second grayscale in a period of one frame.

Figure 4B:
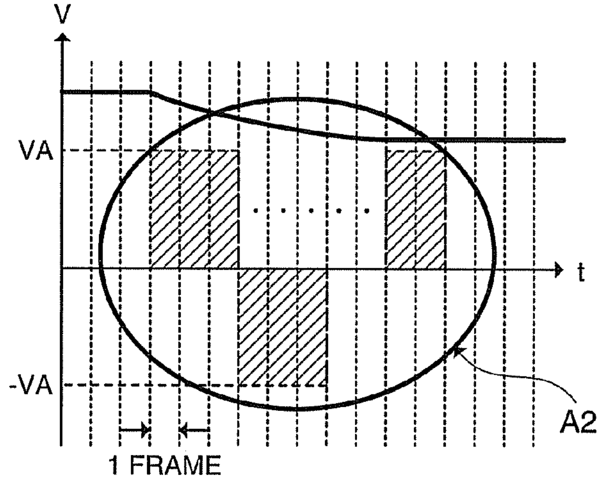
Figure 4C:
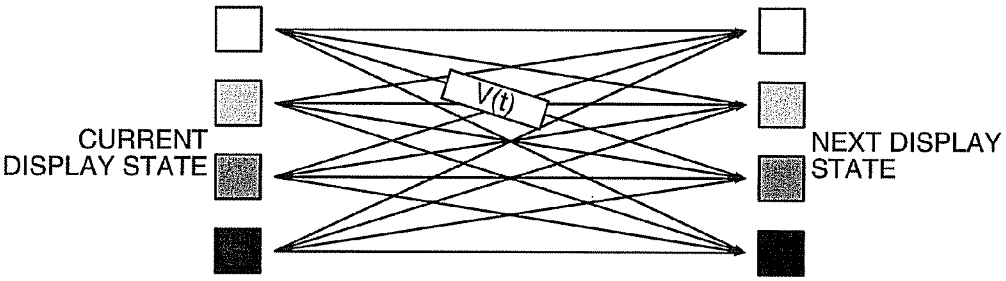

On the other hand, when a pixel grayscale is changed from the first grayscale to the second grayscale in the electrophoretic display device as indicated by A2 of FIG. 4(B), a data voltage of a data line is changed over a plurality of frames. For example, when the grayscale is changed from the first grayscale close to white to the second grayscale close to black, white and black are repeatedly displayed over a plurality of frames and the pixel grayscale is finally changed to the second grayscale. For example, the data voltage is changed over a plurality of frames so that the data voltage is set to VA in the first 3 frames and is set to –VA in the next 3 frames in the waveform of FIG. 4(B). As shown in FIG. 4(C), the waveform also differs depending upon a combination of a pixel grayscale in a current display state and a pixel grayscale in the next display state.

The waveform which implements optimal display characteristics is changed by a difference of a manufacturing lot or the like of the electro-optical device 200. For example, it is not always true that a waveform optimal for the electro-optical device 200 of a first manufacturing lot becomes an optimal waveform in the electro-optical device 200 of a second manufacturing lot.

As shown in FIG. 5(A) in this embodiment, for example, the information register 52 stores a manufacturing lot number or the like of the electro-optical device 200 as wave selection information. Specifically, when the electronic apparatus is manufactured, a manufacturing lot number of the electro-optical device 200 connected to the integrated circuit device 10 is set to the information register 52. The host 100 reads a manufacturing lot number or the like of the information register 52, selects waveform information corresponding to a manufacturing lot thereof from among a plurality of pieces of waveform information, and loads the selected information to the information memory 110.

For example, when the manufacturing lot number of the electro-optical device 200 (the panel module) connected to the integrated circuit device 10 as a display controller is N1, waveform information which defines a waveform as shown in FIG. 5(B) is loaded to the information memory 110 as waveform information at the time of making a change from the first grayscale to the second grayscale. For example, waveform information which defines a waveform as shown in FIG. 5(C) is loaded to the information memory 110 when the manufacturing lot number of the electro-optical device 200 is N2. Even when a waveform from which optimal display characteristics are obtained has been varied for each manufacturing lot, it is possible to respond thereto. Wave selection information is not limited to manufacturing information such as a manufacturing lot number, and may be information of a panel type or size.

When the electronic apparatus is actually operated, the first grayscale as the pixel grayscale of the current display state of FIG. 4(C) and the second grayscale as the pixel grayscale of the next display state are specified by image data of a corresponding pixel stored in the image memory 120. A waveform which makes a change from the first grayscale to the second grayscale is selected from the waveform information. The display control section 36 supplies the data driver 210 with a data signal which specifies data voltages (VA and –VA of FIG. 4(B)) in each frame of the plurality of frames on the basis of the selected waveform. Thereby, the data driver 210 supplies a drive signal as shown in FIG. 4(B) to the data line of the electro-optical panel 230 and the display operation of the electro-optical panel 230 is implemented.

3. Instruction Code Information

Next, an example of instruction code information will be described.

For example, a command issued by the host 100 is implemented by sequentially executing a plurality of instructions which controls the operation of the integrated circuit device 10. For example, in FIG. 6, a command CMA is implemented by sequentially executing instructions INSA1, INSA2, INSA3 . . . , and a command CMB is implemented by sequentially executing instructions INSB1, INSB2, INSB3 . . . . In this embodiment, an instruction code string constituting each command is prepared as instruction code information as described above.

For example, an example of commands to be issued by the host 100 is shown in FIG. 7. For example, RUN_SYS, STBY, and SLP are respectively commands which move the integrated circuit device 10 to a run mode (general operation mode), a standby mode, and a sleep mode. Also, INIT_SYS_RUN is a command which moves the integrated circuit device 10 to the run mode after initializing the integrated circuit device 10. Also, INIT_DSPE_CFG and INIT_DSPE_TMG are respectively commands which initialize a display engine (display control section) and a display timing.

RD_REG is a register read command. Specifically, this is a command in which data read from an address designated by a first parameter is set to a second parameter. WD_REG is a register write command. Specifically, this is a command in which data designated by the first parameter is written to an address designated by the second parameter.

BST_RD_SDR and BST_WR_SDR are commands which give instructions of a burst read operation and a burst write operation of the image memory 120 (SDRAM). By these commands, the host 100 is able to read image data from the image memory 120 or to write image data to the image memory 120.

LD_IMG and LD_IMG_AREA are commands which give instructions of a full frame memory load operation and an area frame memory load operation. By these commands, an image corresponding to image data written to the image memory 120 is capable of being displayed on the electro-optical panel 230.

RD_WFM_INFO is a command which instructs the display engine (display control section) to read waveform information, and UPD_GDRV_CLR is a command used to clear an indefinite state of the scan driver (gate driver). WAIT_DSPE_TRG is a command which gives an instruction to wait for the operation of the display engine to be completed.

The above-described command is implemented by executing a series of instructions which gives instructions to write register values to or read register values from various registers of the register section 50.

For example, when a command of RUN_SYS is issued by the host 100, a disable instruction of a PLL power-down mode, a PLL lock standby instruction, a disable instruction of a power save mode, a start instruction of a power-on sequence, an end instruction of a self-refresh operation of the image memory 120, and instructions of setting of run mode status to a status register and the like are executed using various registers of the register section 50.

When a command of INIT_DSPE_CFG is issued by the host 100, instructions of setting of a line data length (horizontal size), setting of a frame data length (vertical size), various settings of the data driver 210, various settings of the scan driver 220, and the like are executed using various registers of the register section 50.

A series of instruction codes constituting each command is described in the instruction code information. That is, an instruction code string in which instructions/settings to various registers of the register section 50 are performed is described.

For example, in the case where the command of RUN_SYS has been executed to move the integrated circuit device 10 to the run mode, a processing load of the host 100 becomes heavy when the host 100 is constituted to issue all instructions such as the disable instruction of the PLL power-down mode, the PLL lock standby instruction, and the disable instruction of the power save mode.

In this embodiment, the host 100 is constituted to describe a series of instructions constituting each command in instruction code information by issuing only commands (command codes and parameters) of RUN_SYS, INIT_DSPE_CFG, and the like. This is able to reduce the processing load of the host 100 since a series of instructions constituting a command is executed by the host 100 only issuing one command.

In this case, the content of instructions constituting each command may differ depending upon a panel type or size or the like. Thus, as shown in FIG. 2 this embodiment adopts a method of selecting instruction code information corresponding to a panel type or size from among a plurality of pieces of instruction code information and loading the selected information to the information memory 110 when the electronic apparatus in which the integrated circuit device and the electro-optical device 200 are installed is manufactured. Thereby, when the electronic apparatus is actually operated, it is possible to control the operation of the integrated circuit device 10 by reading instruction code information matching a panel type or size from the information memory 110.

Figure 8:
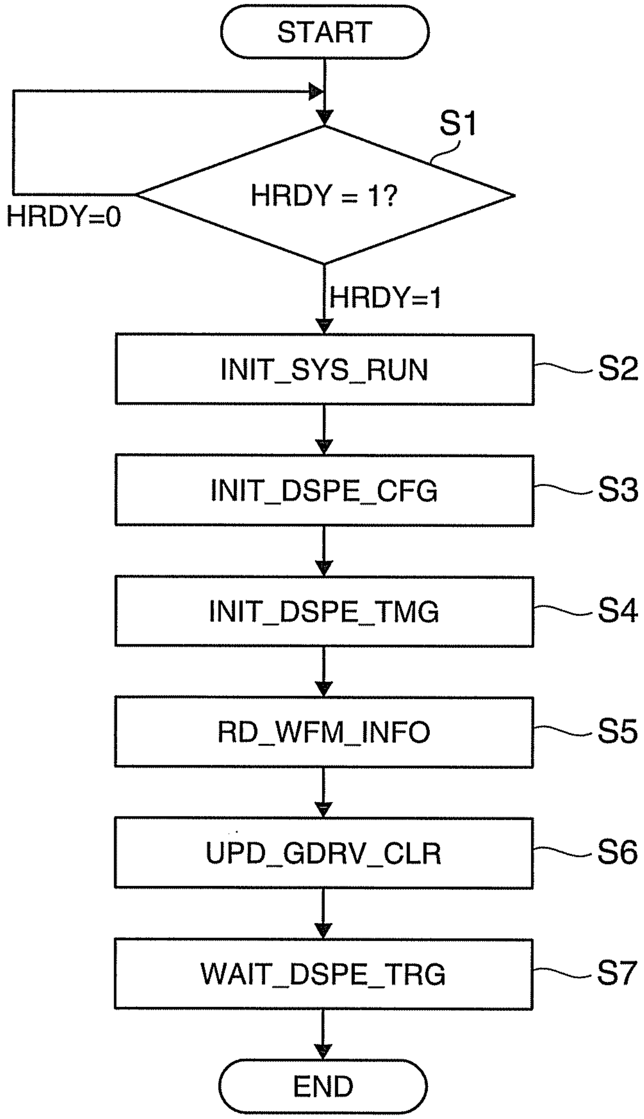
FIG. 8 is a flowchart illustrating a processing example of the host at the time of an actual operation of the electronic apparatus.

FIG. 8 shows a processing example of the host 100 when the electronic apparatus is actually operated. The host 100 (firmware) issues a command INIT_SYS_RUN which gives an instruction to initialize the integrated circuit device 10 and move the integrated circuit device 10 to the run mode when a ready signal HRDY from the host I/F 20 is set to "1" (steps S1 and S2). Then, instructions are given to initialize the display engine and the display timing by issuing commands INIT_DSPE_CFG and INIT_DSPE_TMG (steps S3 and S4).

Next, the host 100 instructs the display engine (display control section) to read waveform information by issuing a command RD_WFM_INFO (step S5). That is, an instruction is given to read waveform information loaded to the information memory 110. Instructions are given to clear the scan driver by issuing the command UPD_GDRV_CLR and make the movement to a state in which it waits for the operation of the display engine to be completed by issuing a command WAIT_DSPE_TRG (steps S6 and S7).

4. Detailed Operation/Configuration

Next, a detailed operation/configuration example of this embodiment will be described.

Figure 9A:
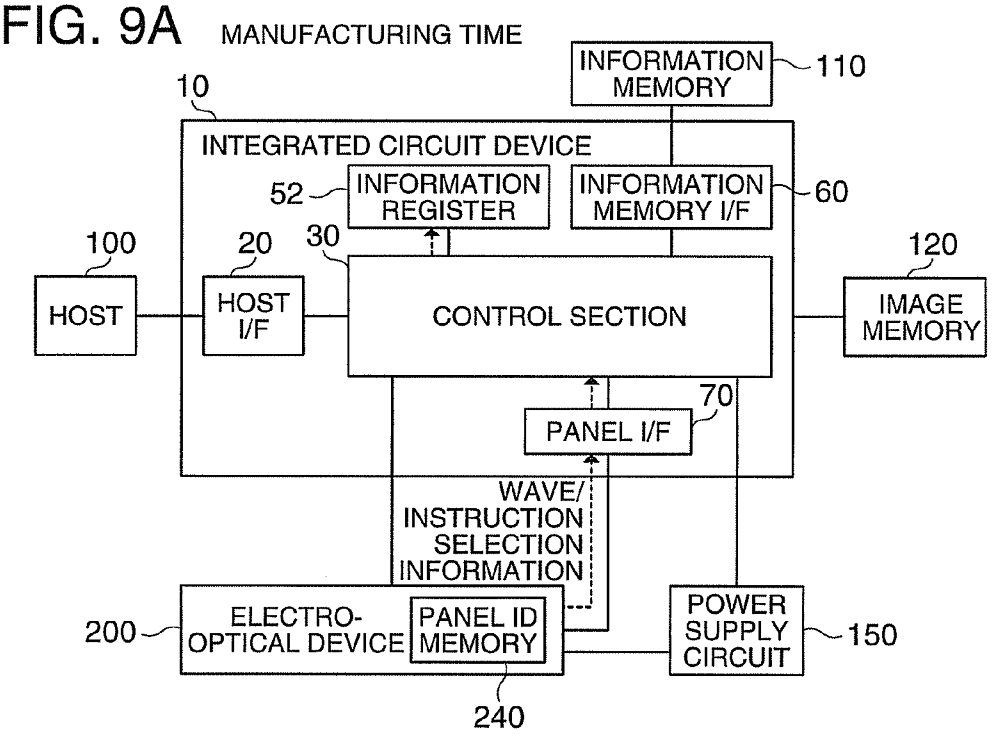
FIGS. 9(A) and 9(B) are diagrams illustrating a detailed operation of the integrated circuit device of this embodiment.

In this embodiment as shown in FIG. 9(A), wave selection information or instruction selection information is acquired from the electro-optical device 200 when the electronic apparatus is manufactured. Specifically, the panel I/F 70 (the electro-optical device interface) which executes an interface process with the electro-optical device 200 is provided in the integrated circuit device 10. Also, the panel ID memory 240 which stores wave selection information (a manufacturing lot number or the like) or instruction selection information (a panel type or size or the like) is provided in the electro-optical device 200. The panel I/F 70 reads the wave selection information or the instruction selection information stored in the panel ID memory 240. Thereby, the read wave selection information or instruction selection information is set to the information register 52.

Figure 9B:
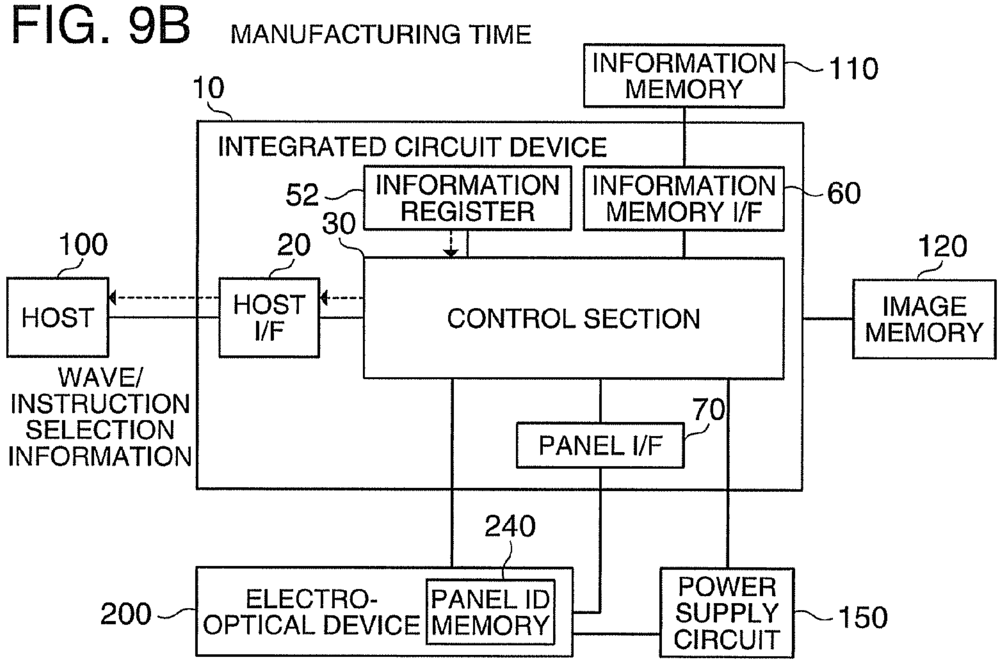

Next, as shown in FIG. 9(B), the host 100 reads the wave selection information or the instruction selection information set to the information register 52 via the host I/F 20. That is, the information is read from a storage address by designating the storage address of the wave selection information or the instruction selection information.

As shown in FIG. 10(A), the host 100 sends instruction code information corresponding to the instruction selection information to the host I/F 20. Then, the instruction code information is loaded to the information memory 110 via the information memory I/F 60.

When the host 100 sends waveform information corresponding to the wave selection information to the host I/F 20, the waveform information is also loaded to the information memory 110 via the information memory I/F 60.

Next, as shown in FIG. 10(B), at the time of an actual operation in which the user uses the electronic apparatus, the instruction code information loaded to the information memory 110 is read via the information memory I/F 60. When the host 100 issues a command, the operation control for the integrated circuit device 10 corresponding to the command is performed on the basis of the issued command and the instruction code information.

When the electronic apparatus is actually operated, the waveform information loaded to the information memory 110 is also read via the information memory I/F 60. Specifically, for example, when the host 100 issues a command (RD_WFM_INFO) to read the waveform information, the waveform information is read. The display of the electro-optical device 200 is controlled on the basis of the waveform information and the image data read from the image memory 120.

As shown in FIG. 10(B), common voltage information is acquired from the electro-optical device 200 at the time of the actual operation of the electronic apparatus. For example, the panel ID memory 240 of the electro-optical device 200 stores information of a common voltage optimal for the electro-optical device 200. For example, when the electro-optical device 200 (the panel module) is manufactured, the common voltage at which display characteristics are optimal is measured and stored in the panel ID memory 240. At the time of the actual operation of the electronic apparatus, the panel I/F 70 reads the common voltage information stored in the panel ID memory 240. Then, the control section 30 controls (sets) the common voltage to be output by the power supply circuit 150 on the basis of the read common voltage information. For example, the power supply control section 40 generates a signal which gives an instruction to output the common voltage corresponding to the common voltage information, and outputs the generated signal to the power supply circuit 150.

Figure 11:
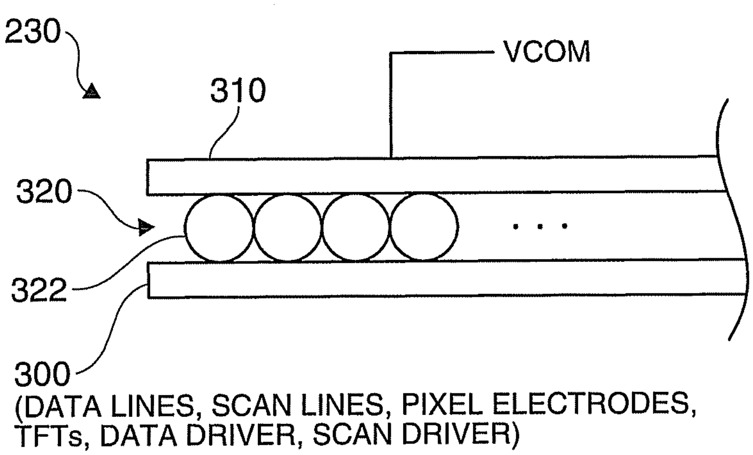
FIG. 11 is an example of an electro-optical panel having an electrophoretic element.

A configuration example of the electro-optical panel 230 is shown in FIG. 11. The electro-optical panel 230 includes an element substrate 300, a facing substrate 310, and an electrophoretic layer 320 provided between the element substrate 300 and the facing substrate 310. The electrophoretic layer 320 (an electrophoretic sheet) is constituted by a plurality of microcapsules 322 having an electrophoretic material. The microcapsules 322 are implemented by dispersing black positive charged particles (electrophoretic materials) positively charged and white negative charged particles (electrophoretic materials) negatively charged into a dispersion liquid and sealing the dispersion liquid into fine capsules.

The element substrate 300 is formed by glass or transparent resin. On the element substrate 300, a plurality of data lines (source lines), a plurality of scan lines (gate lines), and a plurality of pixel electrodes in which each pixel electrode is arranged in an intersection position of a data line and a scan line are formed. A plurality of switch elements are provided in which each switch element formed by a TFT (Thin Film Transistor) or the like is connected to each pixel electrode. The data driver 210 which drives the data lines and the scan driver 220 which drives the scan lines are provided. The electro-optical panel 230 is not limited to an active matrix type panel, and may be a simple matrix type panel.

A common electrode (transparent electrode) is formed to the facing substrate 310, and a common voltage VCOM (facing voltage) is supplied to the common electrode. The power supply circuit 150 generates the common voltage VCOM and supplies the common voltage to the common electrode. The power supply circuit 150 generates and supplies a power supply voltage of the data driver 210 or the scan driver 220. The electrophoretic sheet may be formed by forming the common electrode to a transparent resin layer by a transparent conductive material and adhering the electrophoretic layer by coating an adhesive thereon.

When an electric field is applied between the pixel electrode and the common electrode in the electro-optical panel 230 of FIG. 11, the electrostatic force acts in positive charged particles (black) and negative charged particles (white) sealed into the microcapsules 322 in directions corresponding to positive and negative charges. For example, since the positive charged particles (black) on the pixel electrode having a higher potential than the common electrode move to the common electrode side, a pixel thereof is displayed as black.

Display characteristics of the electro-optical panel 230 are changed by a value of the common voltage VCOM applied to the common electrode, and a value of the common voltage VCOM which implements optimal display characteristics is different with respect to each electro-optical device 200. When the electro-optical device 200 is manufactured, a common voltage value which implements optimal display characteristics is written to the non-volatile panel ID memory 240.

As shown in FIG. 10(B), the common voltage value which implements the optimal display characteristics is read from the panel ID memory 240 via the panel I/F 70 at the time of the actual operation of the electronic apparatus. The power supply control section 40 instructs the power supply circuit 150 to output the common voltage VCOM of the read common voltage value. Thereby, at the time of actual operation of the electronic apparatus, the display operation of the electro-optical panel 230 is capable of being implemented by applying the common voltage VCOM which implements the optimal display characteristics to the common electrode.

Next, details of the host interface will be described using FIGS. 12(A) to 12(C).

Figure 12A:
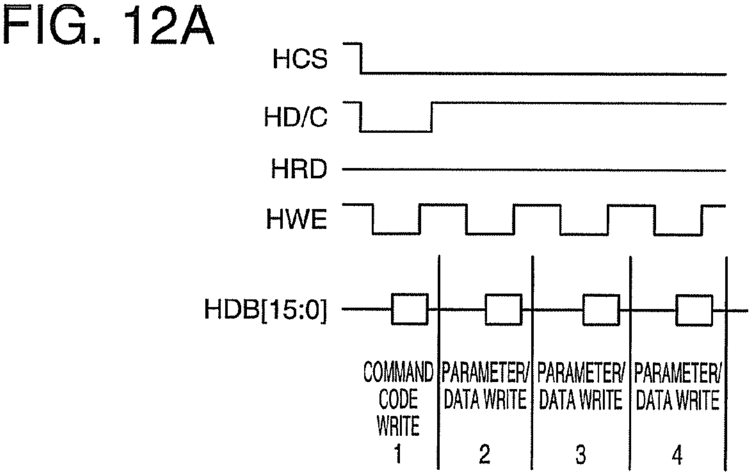
FIGS. 12(A) to 12(C) are diagrams illustrating a host interface.
Figure 12B:
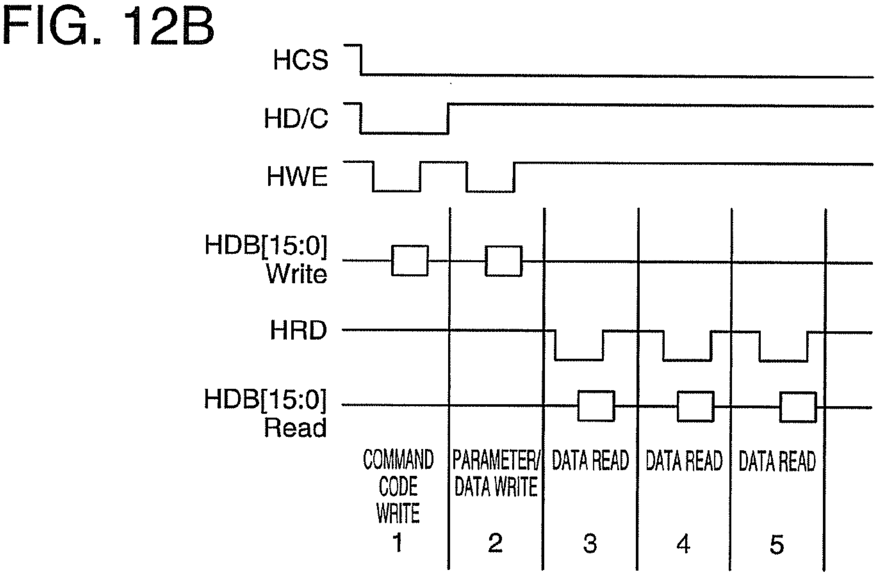

In FIGS. 12(A) and 12(B), HCS is a chip select signal and HD/C is a command/parameter (data) identification signal. HRD and HWE are a read enable signal and a write enable signal, and HDB [15:0] is a data signal.

FIG. 12(A) is a signal waveform diagram of a command mode operation of writing a parameter (data). In FIG. 12(A), a command phase and a parameter (data) phase are identified by the signal HD/C. In the command phase, a code of a command illustrated in FIG. 7 is written. In the parameter (data) phase, a parameter (data) corresponding to the command is written.

FIG. 12(B) is a signal waveform diagram of a command mode operation of reading data of a register. Even in FIG. 12(B), a command phase and a parameter (data) phase are identified by the signal HD/C. In the command phase, a command code is written. Thereafter, in the parameter phase, for example, a parameter which designates an address or the like of a register is written. Thereafter, data is read from the register.

Figure 12C:
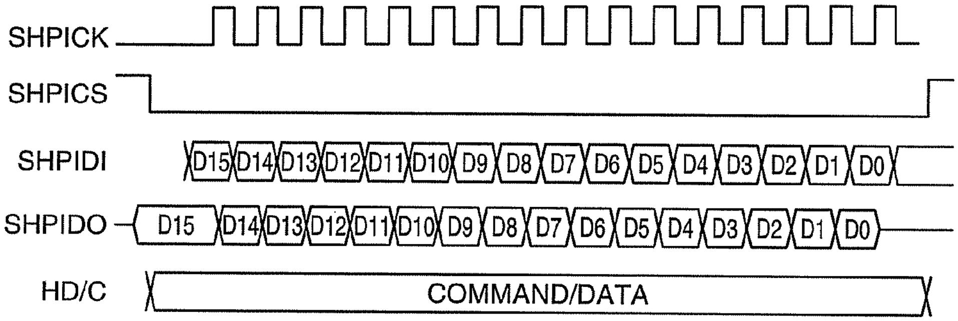

The host interface is not limited to a parallel interface as shown in FIGS. 12(A) and 12(B), and may be a serial interface as shown in FIG. 12(C). In FIG. 12(C), the serial host interface is implemented by a clock signal SHPICK, a chip select signal SHPICS, a serial input data signal SHPIDI, a serial output data signal SHPIDO, and a command/parameter (data) identification signal HD/C.

Next, details of the information memory interface and the panel interface will be described using FIGS. 13(A) to 13(D).

Figure 13A:
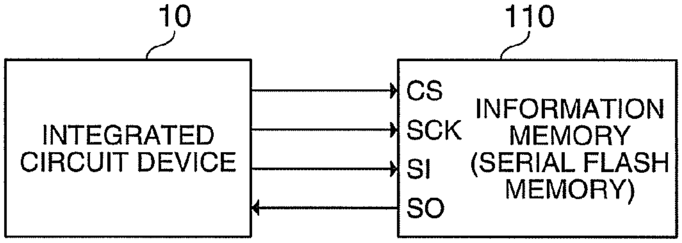
FIGS. 13(A) to 13(D) are diagrams illustrating an information memory interface and a panel interface.
Figure 13B:
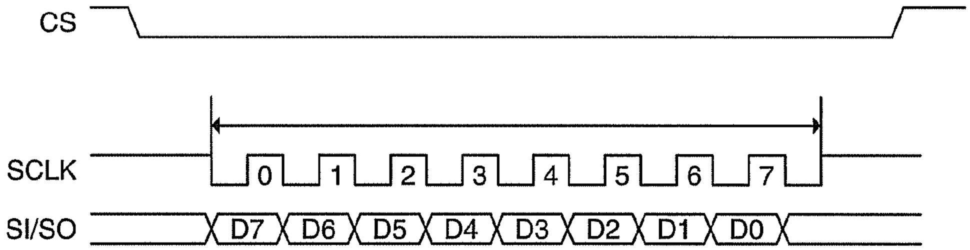

FIG. 13(A) is an example using a serial flash memory as the information memory 110. In this case, the information memory interface is implemented by a chip select signal CS, a clock signal SCLK, a serial input data signal SI, and a serial output data signal SO. FIG. 13(B) shows a waveform example of the above-described signals. After the chip select signal CS is active (L level), the serial input data signal SI and the serial output data signal SO are input/output in synchronization with the clock signal SCLK.

Figure 13C:
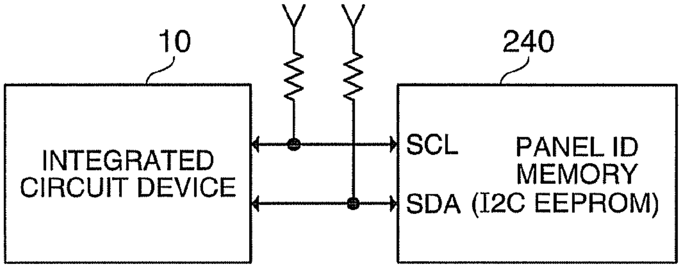

FIG. 13(C) is an example using an EEPROM based on an I2C protocol as the panel ID memory 240. In this case, the panel interface is implemented by signal lines of the clock signal SCL and the serial data signal SDA. The SCL and SDA signal lines are bidirectional signal lines (bidirectional buses), and are pulled up by pull-up resistors. In the I2C, a plurality of slaves is connectable to one master, an individual device has its own address, and an address is included in data to be transmitted by the serial data signal SDA.

Figure 13D:
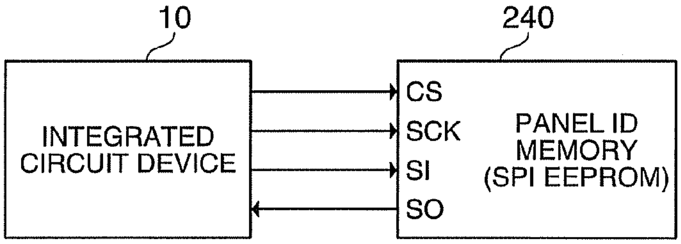

FIG. 13(D) is an example using an EEPROM of a four-wire serial interface (SPI) as the panel ID memory 240. In this case, the panel interface is implemented by a chip select signal CS, a clock signal SCK, a serial input data signal SI, and a serial output data signal SO.

The host interface, the information memory interface, and the panel interface are not limited to the interfaces illustrated in FIGS. 12(A) to 13(D), and it is possible to adopt various interfaces corresponding to the host, the information memory, and the panel ID memory.

5. Stack Mode/Non-Stack Mode

Figure 14A:
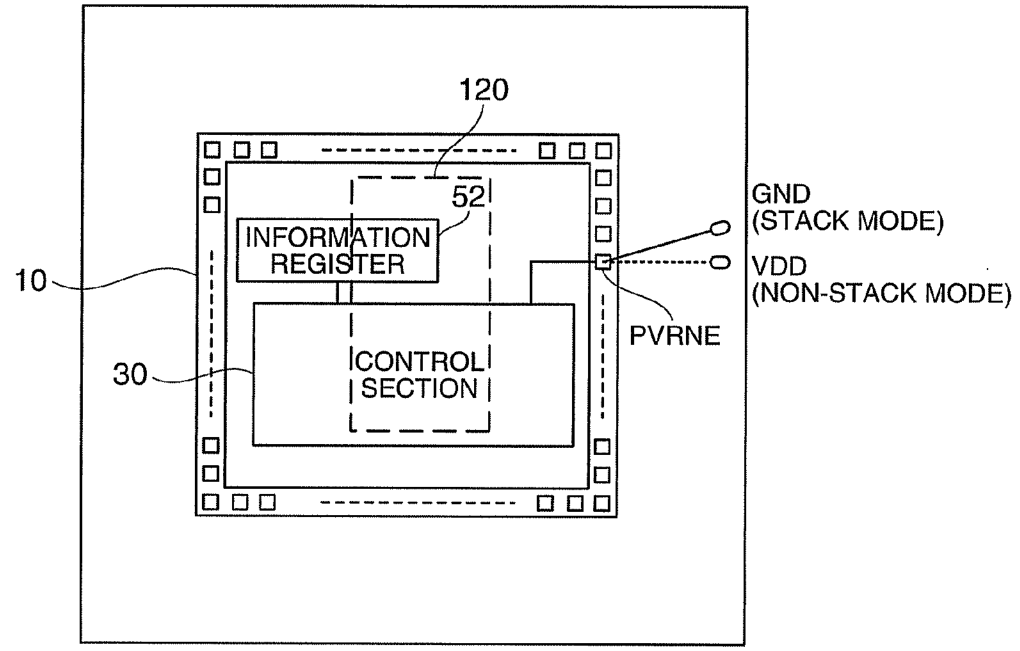
FIGS. 14(A) and 14(B) are diagrams illustrating an instruction code information loading method based on stack identification information.

The integrated circuit device 10 of this embodiment has the stack mode and the non-stack mode. As shown in FIG. 14(A), the stack mode (stack state) is a mode (state) in which a chip of the image memory 120 which stores image data is stacked on the integrated circuit device 10 (a display controller chip). That is, two IC chips (an image memory and a display controller) manufactured by different manufacturing processes are stacked and packaged. The non-stack mode is a mode (state) in which the chip of the image memory 120 is not stacked on the integrated circuit device.

In the stack mode, a memory pad (electrode) of the image memory 120 is internally wired by bonding with the pad (electrode) of the integrated circuit device 10. Thereby, it is possible to store image data from the host 100 or the like in the image memory 120 which functions as a VRAM even though an external image memory is not used.

On the other hand, in the non-stack mode, the external image memory (an image memory chip provided outside thereof) is used in place of the image memory 120. Image data is written or read by accessing the external image memory using an address signal, a data signal, a control signal, or the like from the pad of the integrated circuit device 10.

It is desirable to manufacture the chip itself of the integrated circuit device 10 using the same mask data for cost reduction when correspondence to both the stack mode and the non-stack mode is made. That is, when the integrated circuit device for the stack mode and the integrated circuit device for the non-stack mode are separate IC chips manufactured by different mask data, this results in the increase in cost and the complexity in product management.

In FIG. 14(A), the changeover of the stack mode and the non-stack mode is implemented by the bonding wiring to the pad of the integrated circuit device 10. Specifically, a pad PVRNE for stack identification is provided as the pad of the integrated circuit device 10 in FIG. 14(A). The pad PVRNE for stack identification is set to GND (a first power supply voltage in a broad sense) in the stack mode, and is set to VDD (a second power supply voltage) in the non-stack mode. Specifically, in the stack mode, a bonding wire set to the potential of GND (a bonding wire connected to a GND terminal of a package) is connected to the pad PVRNE for stack identification at the time of packaging the IC chip. On the other hand, in the non-stack mode, a bonding wire set to the potential of VDD (a bonding wire connected to a VDD terminal of the package) is connected to the pad PVRNE for stack identification at the time of packaging the IC chip.

Figure 14B:
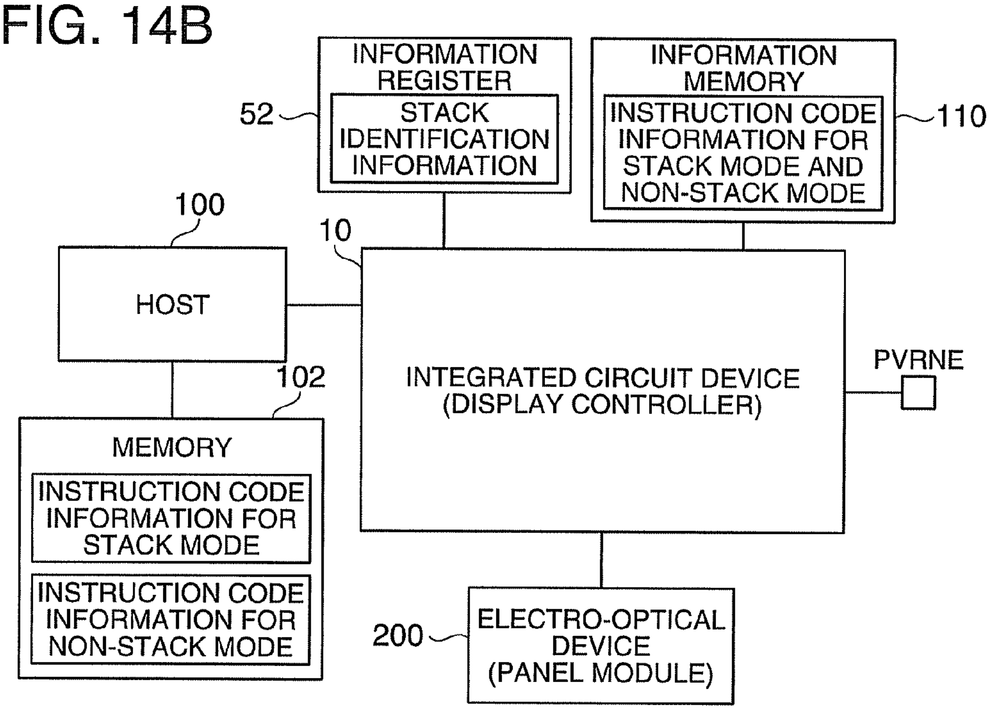

As shown in FIG. 14(B), the information register 52 stores stack identification information for identifying the stack mode in which the chip of the image memory 120 is stacked on the integrated circuit device and the non-stack mode in which the stack is not made as instruction selection information. For example, the information register 52 stores the stack identification information set on the basis of a voltage of the pad PVRNE for stack identification of FIG. 14(A). Specifically, the information register 52 stores a stack identification bit as the stack identification information. The stack identification bit is set to a first logic level (for example, "0") when the pad PVRNE for stack identification is set to GND, and is set to a second logic level (for example, "1") when PVRNE is set to VDD.

When the stack mode is set by the pad PVRNE for stack identification or the like, instruction code information for the stack mode is loaded to the information memory 110 from among a plurality of pieces of instruction code information at the time of manufacturing the electronic apparatus. At the time of the actual operation of the electronic apparatus, the operation of the integrated circuit device 10 is controlled on the basis of the command issued by the host 100 and the instruction code information for the stack mode.

On the other hand, when the non-stack mode is set, instruction code information for the non-stack mode from among the plurality of pieces of instruction code information is loaded to the information memory 110 at the time of manufacturing the electronic apparatus. At the time of the actual operation of the electronic apparatus, the operation of the integrated circuit device 10 is controlled on the basis of the command issued by the host 100 and the instruction code information for the non-stack mode.

For example, an integrated circuit device set to the stack mode and an integrated circuit device set to the non-stack mode are provided to users as special products. For a user desiring to use a memory having a larger capacity than the stacked image memory, a product set to the non-stack mode is provided and an external image memory as a VRAM is used. The stacked image memory and the external image memory have a different data bit width or a different address bit width. For example, in the stacked image memory, data has a 16-bit width and an address has an 11-bit width. For example, in the external image memory, it is possible to use a memory in which data has a 32-bit width and an address has a 13-bit width.

When a data or address bit width (number of bits) is different as described above, the content of an instruction code constituting a command becomes different. Accordingly, in the stack mode, instruction code information for the stack mode in which an instruction code suitable for the stacked image memory is described is loaded to the information memory 110. On the other hand, in the non-stack mode, instruction code information for the non-stack mode in which an instruction code suitable for the external image memory is described is loaded to the information memory 110.

On the other hand, as shown in FIG. 14(A), when the stack mode and the non-stack mode are switched by bonding to the pad PVRNE for stack identification, it is difficult to discriminate whether the integrated circuit device 10 is in the stack mode or the non-stack mode from the external appearance of the package.

In this embodiment, the information register 52 stores stack identification information set on the basis of a voltage of the pad PVRNE for the stack identification. The host 100 is able to identify whether the integrated circuit device 10 is in the stack mode or the non-stack mode by reading the stack identification information of the information register 52 via the host I/F 20. Instruction code information for the stack mode is loaded to the information memory 110 in the case of the stack mode, and the instruction code information for the non-stack mode is loaded to the information memory 110 in the case of the non-stack mode.

At the time of manufacturing the electronic apparatus, it is automatically determined whether the integrated circuit device 10 is a product of the stack mode or a product of the non-stack mode on the basis of the stack identification information of the information register 52, and instruction code information corresponding to each mode is loaded to the information memory 110. Accordingly, this is able to promote the efficiency of manufacturing as compared to a method of selecting and loading instruction code information by a manual operation or the like at the time of manufacturing the electronic apparatus. Accordingly, it is possible to improve the manufacturing throughput and to facilitate the mass production of electronic apparatus or the like.

Figure 15:
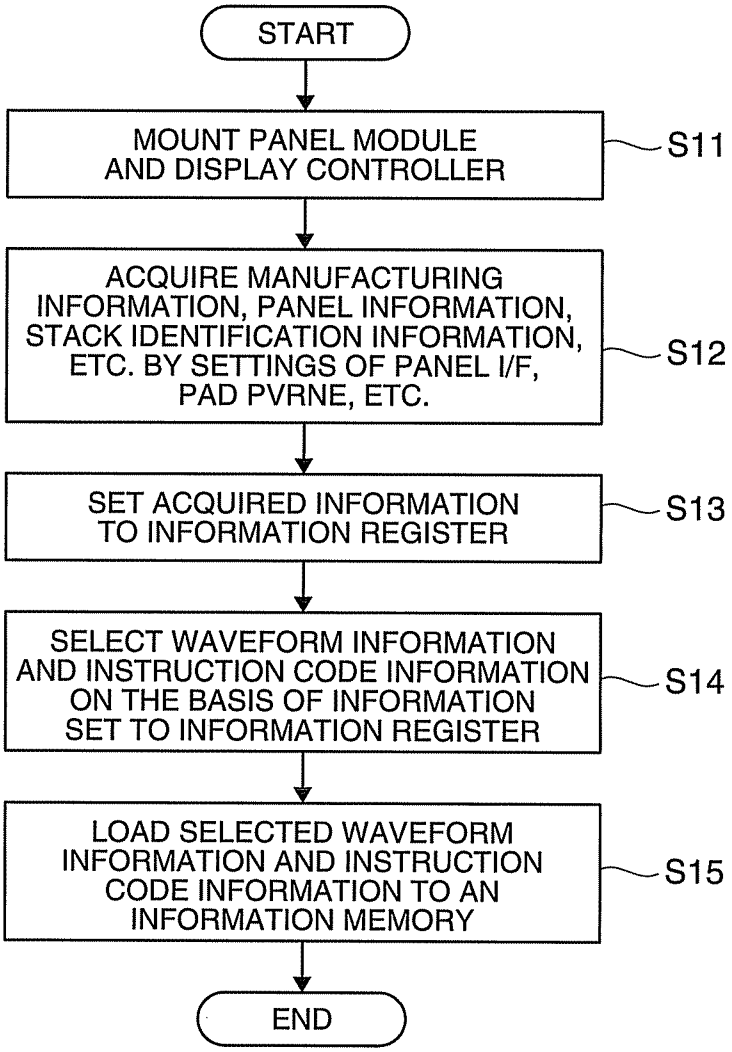
FIG. 15 is an example of a flow of manufacturing the electronic apparatus.

FIG. 15 shows an example of a manufacturing flow of the electronic apparatus into which the integrated circuit device and the electro-optical device are embedded.

First, the panel module as the electro-optical device and the display controller as the integrated circuit device are installed (step S11). For example, a system board (circuit board) on which the display controller or the host CPU and the panel module are connected by a connector or the like.

Next, manufacturing information, panel information, or stack identification information (wave selection information and instruction selection information) is acquired by settings of the panel I/F or the pad PVRNE (step S12). For example, it is possible to acquire the manufacturing information or the panel information by reading the information from the panel ID memory of the panel module as illustrated in FIGS. 9(A) and 9(B). It is possible to acquire the stack identification information by the voltage setting of the pad PVRNE as illustrated in FIG. 14(A). The acquired information (wave selection information and instruction selection information) is set to the information register (step S13).

Next, waveform information and instruction code information are selected on the basis of the information set to the information register (step S14). That is, the waveform information or the instruction code information corresponding to the manufacturing information, the panel information, or the stack identification information is selected. The selected waveform information or instruction code information is loaded to the information memory (step S15). That is, the selected waveform information or instruction code information is loaded to the information memory from which information is read by the integrated circuit device at the time of the actual operation of the electronic apparatus. Thereby, it is possible to implement the display control for the panel module or the operation control for the display controller using appropriate waveform information or instruction code information at the time of the actual operation of the electronic apparatus.

Although this embodiment has been described in detail above, those skilled in the art would readily appreciate that many modifications are possible without materially departing from the novel teachings and advantages of the invention. Accordingly, such modifications are intended to be included within the scope of the invention. Any term (panel I/F, panel ID memory, or the like) cited with a different term (electro-optical device interface, memory, or the like) having a broader meaning or the same meaning at least once in the specification and the drawings can be replaced by a different term in any place in the specification and the drawings. The configurations and operations of the integrated circuit device and the electronic apparatus are not limited to those described in this embodiment. Various modifications and variations may be made.

The invention claimed is:

1. An integrated circuit device comprising:

a host interface which executes an interface process with a host;

an information register which offers information to the host; and a control section which controls display of an electro-optical device, wherein the information register stores wave selection information for selecting waveform information which defines a waveform of a drive signal of the electro-optical device, wherein waveform information is selected by the wave selection information stored in the information register according to a manufacturing lot of the electro-optical device in order to achieve a desired drive signal for the electro-optical device, wherein the selected waveform information is selected from among a plurality of pieces of waveform information corresponding to a plurality of different electro-optical device characteristics, wherein the selected waveform information is loaded to an information memory at the time of manufacturing an electronic apparatus including the electro-optical device, and wherein the control section controls the display of the electro-optical device on the basis of the selected waveform information read from the information memory at the time of an actual operation of the electronic apparatus.

2. The integrated circuit device according to claim 1, comprising:

an information memory interface which executes an interface process with the information memory, wherein the information memory interface writes the selected waveform information to the information memory when the selected waveform information has been acquired via the host interface at the time of manufacturing the electronic apparatus, wherein the information memory interface reads the selected waveform information from the information memory at the time of the actual operation of the electronic apparatus, and wherein the control section controls the display of the electro-optical device on the basis of the selected waveform information read from the information memory at the time of the actual operation of the electronic apparatus.

3. The integrated circuit device according to claim 1, wherein the information register stores the wave selection information acquired from the electro-optical device at the time of manufacturing the electronic apparatus, and offers the stored information to the host.

4. The integrated circuit device according to claim 3, comprising:

an electro-optical device interface which executes an interface process with the electro-optical device, wherein the electro-optical device interface reads the wave selection information from a memory provided in the electro-optical device at the time of manufacturing the electronic apparatus.

5. The integrated circuit device according to claim 3, comprising:

an electro-optical device interface which executes an interface process with the electro-optical device, wherein the control section controls a power supply circuit of the electro-optical device, wherein the electro-optical device interface reads common voltage information for driving the electro-optical device from the electro-optical device at the time of the actual operation of the electronic apparatus, and wherein the control section controls a common voltage to be output by the power supply circuit on the basis of the read common voltage information.

6. The integrated circuit device according to claim 1, wherein the information register stores the manufacturing lot of the electro-optical device as the wave selection information.

7. The integrated circuit device according to claim 1, wherein the information register stores instruction selection information for selecting instruction code information in which an instruction code constituting each command issued by the host is described, wherein instruction code information selected by the instruction selection information stored in the information register from among a plurality of pieces of instruction code information is loaded to the information memory at the time of manufacturing the electronic apparatus, and wherein the control section controls an operation of the integrated circuit device on the basis of the command issued by the host and the selected instruction code information read from the information memory at the time of the actual operation of the electronic apparatus.

8. An integrated circuit device comprising:

a host interface which executes an interface process with a host;

an information register which offers information to the host; and a control section which controls display of an electro-optical device, wherein the information register stores instruction selection information for selecting instruction code information in which an instruction code constituting each command issued by the host is described, wherein instruction code information is selected by the instruction selection information stored in the information register according to a manufacturing lot of the electro-optical device, wherein the selected instruction code information is selected from among a plurality of pieces of instruction code information corresponding to a plurality of different electro-optical device characteristics, wherein the selected instruction code information is loaded to an information memory at the time of manufacturing an electronic apparatus including the electro-optical device, and wherein the control section controls an operation of the integrated circuit device on the basis of the command issued by the host and the selected instruction code information read from the information memory at the time of an actual operation of the electronic apparatus.

9. The integrated circuit device according to claim 7, wherein the information register stores stack identification information for identifying a stack mode in which a chip of an image memory storing image data is stacked on the integrated circuit device and a non-stack mode in which the image memory chip is not stacked on the integrated circuit device as the instruction selection information.

10. The integrated circuit device according to claim 9, wherein in the stack mode, the selected instruction code information is selected for the stack mode from among the plurality of pieces of instruction code information is loaded to the information memory at the time of manufacturing the electronic apparatus, and the operation of the integrated circuit device is controlled on the basis of the command issued by the host and the selected instruction code information for the stack mode at the time of the actual operation of the electronic apparatus, and wherein in the non-stack mode, the selected instruction code information is selected for the non-stack mode from among the plurality of pieces of instruction code information is loaded to the information memory at the time of manufacturing the electronic apparatus, and the operation of the integrated circuit device is controlled on the basis of the command issued by the host and the selected instruction code information for the non-stack mode at the time of the actual operation of the electronic apparatus.

11. The integrated circuit device according to claim 9, comprising:

a pad for stack identification in which a first power supply voltage is set by a bonding wire in the stack mode, and a second power voltage is set by a bonding wire in the non-stack mode, wherein the information register stores the stack identification information set on the basis of a voltage of the pad for stack identification.

12. An electronic apparatus comprising:

the integrated circuit device described in claim 1; and the electro-optical device.

13. A method of manufacturing an electronic apparatus having an electro-optical device and an integrated circuit device which controls the electro-optical device, comprising:

acquiring wave selection information for selecting waveform information, which defines a waveform of a drive signal of the electro-optical device, from the electro-optical device, setting the acquired wave selection information to an information register of the integrated circuit device;

selecting waveform information for controlling display of the electro-optical device by the integrated circuit device at the time of an actual operation of the electronic apparatus, wherein the selected waveform information is selected from among a plurality of pieces of waveform information corresponding to a plurality of different electro-optical device characteristics, and wherein the selected waveform information is selected on the basis of the wave selection information set to the information register according to a manufacturing lot of the electro-optical device in order to achieve a desired drive signal for the electro-optical device; and at the time of manufacturing the electronic apparatus, loading the selected waveform information to the an information memory, wherein the selected waveform information is read from the information memory by the integrated circuit device at the time of the actual operation of the electronic apparatus.

14. A method of manufacturing an electronic apparatus having an electro-optical device and an integrated circuit device which controls the electro-optical device, comprising:

acquiring instruction selection information for selecting instruction code information in which an instruction code constituting each command issued by a host is described;

setting the acquired instruction selection information to an information register of the integrated circuit device;

selecting instruction code information for controlling an operation of the integrated circuit device at the time of an actual operation of the electronic apparatus, wherein the selected instruction code information is selected from among a plurality of pieces of instruction code information corresponding to a plurality of different electro-optical device characteristics, and wherein the selected instruction code information is selected on the basis of the instruction selection information set to the information register according to a manufacturing lot of the electro-optical device; and at the time of manufacturing the electronic apparatus, loading the selected instruction code information to an information memory, wherein the selected waveform information is read from the information memory by the integrated circuit device at the time of the actual operation of the electronic apparatus.

* * * * *